United States Patent [19]

Hoppe et al.

[11] Patent Number: 5,239,063
[45] Date of Patent: Aug. 24, 1993

[54] FIBRE REACTIVE AZO DYESTUFFS

[75] Inventors: Manfred Hoppe, Kürten; Martin Michna, Pulheim; Karl-Josef Herd, Odenthal-Holz; Frank-Michael Stöhr, Odenthal, all of Fed. Rep. of Germany

[73] Assignee: Bayer Aktiengesellschaft, Leverkusen, Fed. Rep. of Germany

[21] Appl. No.: 818,328

[22] Filed: Jan. 9, 1992

[30] Foreign Application Priority Data

Jan. 17, 1991 [DE] Fed. Rep. of Germany ....... 4101177

[51] Int. Cl.$^5$ .................. C09B 62/085; C09B 43/16; C09B 44/02; D06P 1/382
[52] U.S. Cl. .................. 534/612; 534/583; 534/589; 534/598; 534/605; 534/638; 534/887
[58] Field of Search .................. 534/605, 612

[56] References Cited

U.S. PATENT DOCUMENTS

| | | | |
|---|---|---|---|
| 3,519,614 | 7/1970 | Ponzini | 534/612 |
| 4,544,737 | 10/1985 | Stohr et al. | 534/605 |
| 4,845,202 | 7/1989 | Schlafer et al. | 534/605 |
| 4,875,903 | 10/1989 | Pedrazzi | 534/605 X |
| 4,988,803 | 1/1991 | Stohr et al. | 534/635 |
| 5,023,324 | 6/1991 | Moser | 534/605 X |

FOREIGN PATENT DOCUMENTS

| | | | |
|---|---|---|---|
| 0769122 | 12/1971 | Belgium | 534/605 |
| 2634308 | 2/1977 | Fed. Rep. of Germany | 534/605 |
| 3514969 | 10/1986 | Fed. Rep. of Germany | 534/605 |
| 2319689 | 2/1977 | France | 534/612 |
| 61-7358 | 1/1986 | Japan | 534/605 |
| 62-81455 | 4/1987 | Japan | 534/605 |
| 946998 | 1/1964 | United Kingdom | 534/612 |
| 982479 | 2/1965 | United Kingdom | 534/612 |
| 1279823 | 6/1972 | United Kingdom | 534/612 |
| 1323253 | 7/1973 | United Kingdom | 534/612 |

*Primary Examiner*—Floyd D. Higel
*Attorney, Agent, or Firm*—Sprung Horn Kramer & Woods

[57] ABSTRACT

Fiber reactive azo dyestuffs of the formula

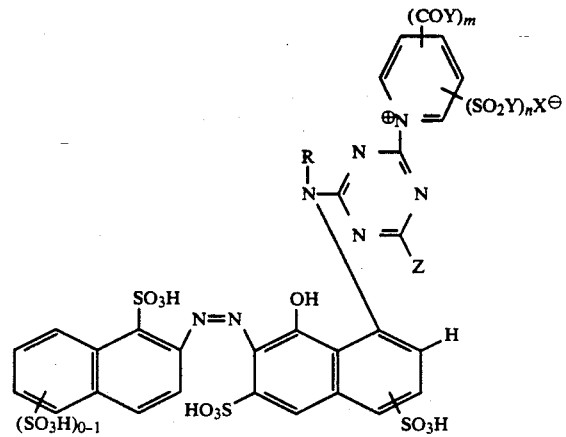

in which
R=H or $C_1$-$C_6$ alkyl, which can be substituted with OH, Hal, $SO_3H$ or $OSO_3H$;
Z=heterocyclic five or six membered ring;
n, m=0, 1 or 2, wherein n+m=0, 1 or 2;
Y=OH, OR, $NR_2R_3$, OMe; and
$R_2$, $R_3$, =H, R and $R_2$, $R_3$ and N can form a heterocyclic 5 or 6-membered ring.

6 Claims, No Drawings

FIBRE REACTIVE AZO DYESTUFFS

The present invention relates to fiber-reactive azo dyestuffs, which in the form of the free acid have the following formula

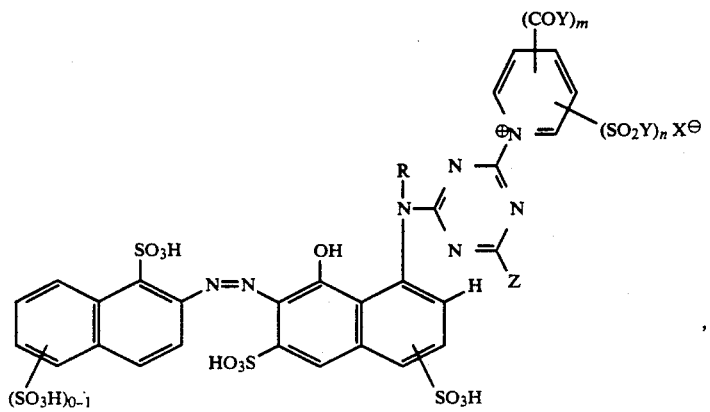

(I)

in which
R = H or $C_1$–$C_6$-alkyl, in which the alkyl groups are unsubstituted or substituted by OH, halogen, $SO_3H$ or $OSO_3H$,
Z = a heterocyclic saturated nitrogen-containing five- or six-membered ring, which may contain further hetero atoms, such as N, O, S or $SO_2$, and is bound to the triazine ring via the N atom, in particular a heterocycle having at least two hetero atoms as ring members
n, m = 0, 1 or 2, where m + n = 0, 1 or 2
Y = OH, OR, $NR_2R_3$, OMe,
$R_3$, $R_2$ = H, R, it being possible for $R_2$ and $R_3$ together with the N atom to form a heterocyclic 5- or 6-membered ring,
Me = alkali metal or alkaline earth metal, in particular Li, Na, K,
$X^-$ = anion of a mono- or polybasic organic or inorganic acid.

In a particularly preferred embodiment, Z denotes:

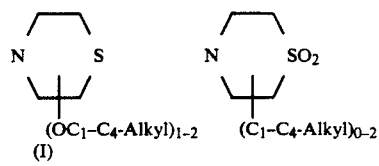

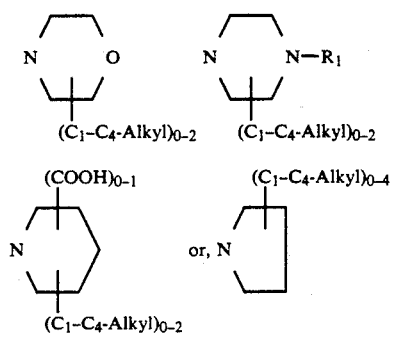

in which
$R_1$ = H or $C_1$–$C_6$-alkyl with is unsubstituted or substituted by water-solubilising substituents.
Suitable substituents for $R_1$ are in particular OH, $OSO_3H$, $SO_3H$, COOH.

Preference is given to azo dyestuffs of the formula (Ia)

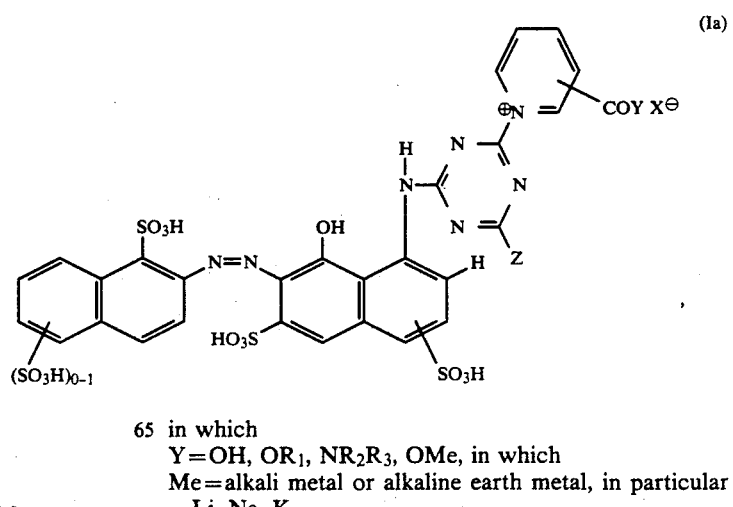

in which
Y = OH, $OR_1$, $NR_2R_3$, OMe, in which
Me = alkali metal or alkaline earth metal, in particular Li, Na, K,

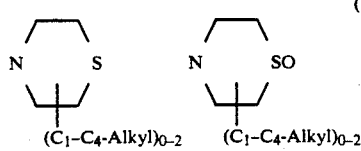

$X^-$ = anion of a mono- or polybasic organic or inorganic acid, $R_3$, $R_2$ = H, R, it being possible for $R_2$ and $R_3$ together with the N atom to form a heterocyclic 5- or -membered ring and Z and R having the abovementioned meaning.

Particular preference is given to dyestuffs of the formula (Ib)

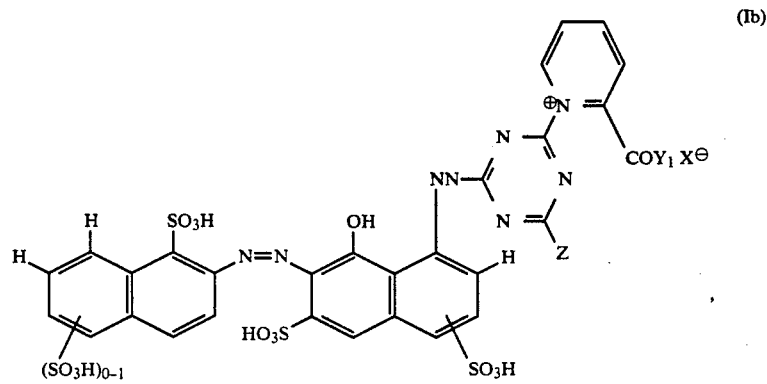

(Ib)

in which
Z =

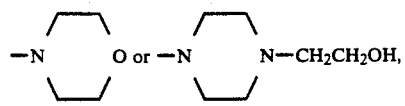

$Y_1$ = OH or $NH_2$, $X^-$ = anion of a mono- or polybasic organic or inorganic acid.

Very particular preference is given to dyestuffs of the formulae

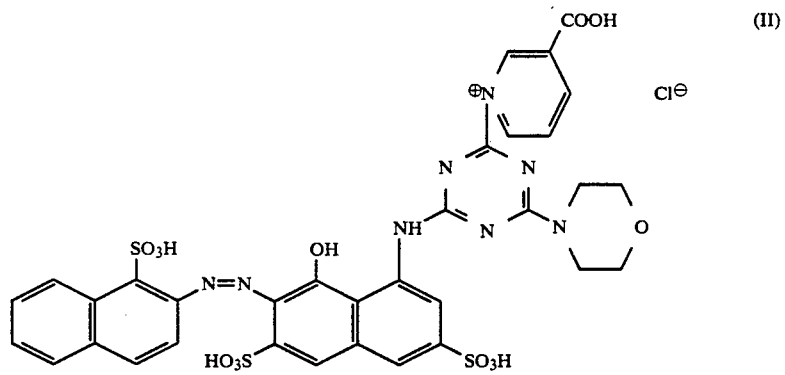

(II)

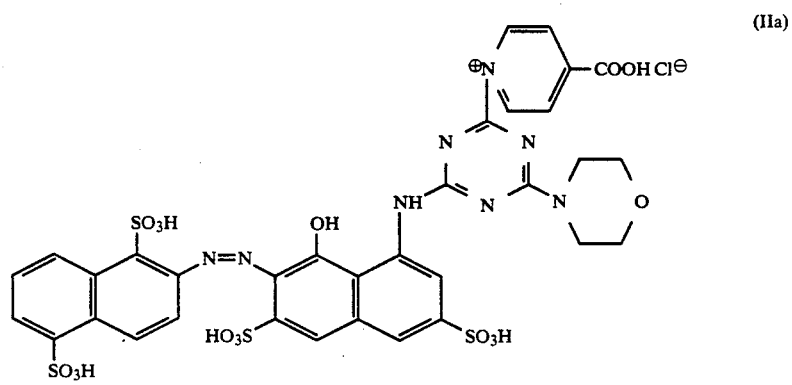

(IIa)

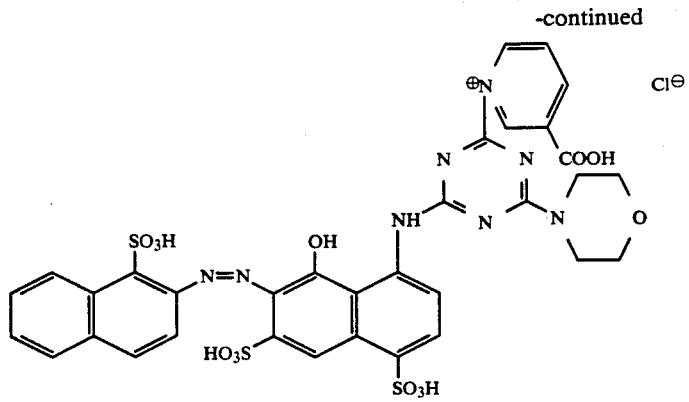

(III)

and

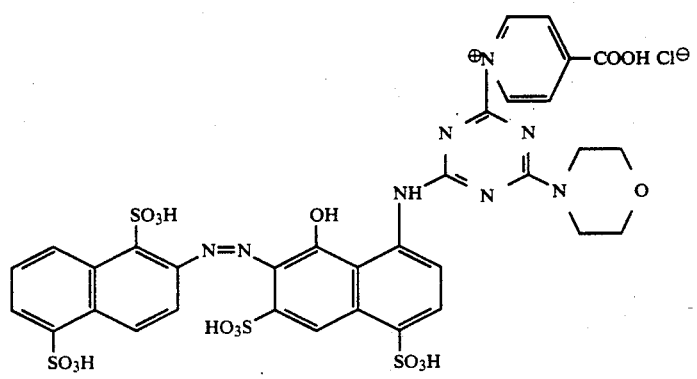

(IIIa)

The formulae given are those of the free acids. In the preparation, the salts are in general obtained, in particular the alkali metal salts, such as sodium salts, potassium salts or lithium salts. The charge formed by quaternisation with pyridines is compensated, depending on the conditions of isolation, by a counter ion $X^\ominus$, for example chloride, fluoride or sulphate.

Examples of suitable anions $X^\ominus$ are $SO_3^\ominus$, $HCO_3^\ominus$, $CL^\ominus$, $Br^\ominus$, $F^\ominus$, $HSO_3^\ominus$, $H_2PO_4^\ominus$, $HCOO^\ominus$, $HBO_2^{2\ominus}$.

Which counter ions are present in the final product, depends upon which ions were added in the preceding synthesis steps together with the reagents or were formed from these in the course of further synthesis and on the conditions under which any crystallisations and isolations are carried out. During pressure permeation, the relative amounts of the individual ions can change again. Furthermore, inner salts can be formed with carboxylate and sulphonate groups.

The dyestuffs according to the invention are highly suitable for the dyeing and printing of natural and synthetic OH— or amido-containing materials, in particular those comprising cellulose and polyamides. They are particularly suitable for the dyeing of cellulose materials by the exhaust and cold pad-batch methods, and for the printing of cotton and staple viscose.

The dyestuffs can be used not only as solid formulations but also as concentrated solutions.

Owing to their good solubility and stability, the dyestuffs according to the invention are particularly suitable for the preparation of concentrated liquid formulations. In a preferred embodiment, the dyestuffs are purified by pressure permeation.

The dyeings or prints on cellulose materials obtainable by means of these dyestuffs are distinguished by a high stability of the fiber to dyestuff bond and by excellent resistance to oxidising agents, such as peroxide- or chlorine-containing detergents. The ease with which the hydrolysis products formed during dyeing or printing can be washed off is excellent.

The dyestuffs according to the invention are obtainable by the preparation processes customary for the synthesis of reactive dyestuffs.

Thus, for example, the new dyestuffs can be prepared in the following manner:

1st step condensation of aminonaphtholdisulphonic acid with trifluorotriazine or trichlorotriazine (=reaction product A)

2nd step condensation of difluorotriazinylaminonaphtholdisulphonic or dichlorotriazinylaminonaphtholdisulfonic acid with the amine H-Z (=reaction product B)

3rd step diazotisation of the diazo component and coupling onto reaction product B 4th step reaction of reaction product B in the presence of acid-binding agents with a compound of the formula

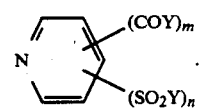

(IV)

The reaction is preferably carried out in an aqueous or aqueous-organic medium at temperatures of about 40 to 140° C., preferably 60° to 90° C., at pH values of about 3 to 10, preferably 6 to 8 when Fluorotriazine- and 4–6 when chlorotriazine is used.

A further possibility of preparing the dyestuffs consists in interchanging reaction steps 2 and 3, i.e. the coupling reaction is carried out using reaction product A in the 2nd step and the product is only then reacted with the amine H-Z in the 3rd step.

This is followed by condensation with a pyridine derivative of the formula (IV).

maintained at 8.3 using 20% strength sodium carbonate solution, and the coupling is allowed to go to completion. The dyestuff of the formula

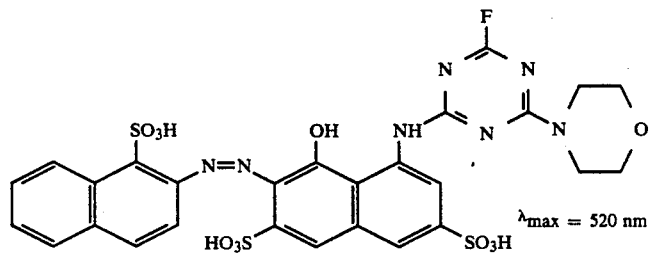

$\lambda_{max}$ = 520 nm

EXAMPLE 1

31.9 g of 1-hydroxy-8-aminonaphthalene-3,6-disulphonic acid are dissolved in 400 ml of water under neutral conditions. At 0° to 5° C., 8.8 ml of trifluorotriazine are added, and the pH is maintained at 4.0 to 4.5 by adding 20% strength sodium carbonate solution. After 5 minutes, 9 g of morpholine are added, and the pH is maintained at 7 using 20% strength sodium carbonate solution. After 15 minutes at 10° C., the reaction is complete. The solution thus obtained of the compound of the formula

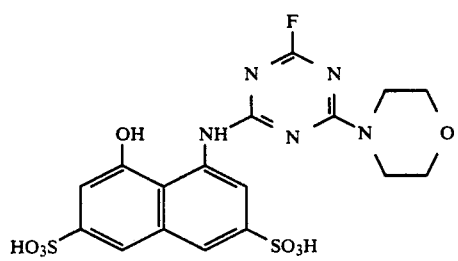

is further reacted as follows:

A diazonium salt suspension obtained by diazotisation of 22.3 g of 2-aminonaphthalene-1-sulphonic acid prepared in the usual manner is added to the reaction product obtained at 0° to 5° C. At the same time, the pH is is salted out and filtered off with suction.

The paste thus obtained is stirred into 150 ml of water, and 12.5 g of nicotinic acid (pyridine-3-carboxylic acid) are added. The mixture is heated to 80° to 85° C. and the pH maintained at 7.5 using sodium carbonate solution. After 4 to 6 hours, the condensation is complete and the dyestuff of the formula

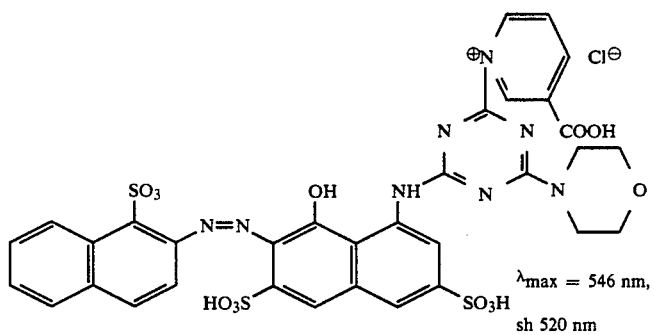

$\lambda_{max}$ = 546 nm, sh 520 nm is salted out, filtered off with suction, dried and ground.

A further possibility of preparing the dyestuff consists in reacting the reaction mixture from the azo coupling with nicotinic acid without isolating the intermediates.

If desired, the process can be simplified yet further by processing the reaction solution after the nicotinic acid condensation further directly to a liquid formulation by concentrating.

Clear blueish-red dyeings are obtained with this dyestuff by an application process customary for reactive dyestuffs.

EXAMPLE 2

The procedure described in Example 1 is repeated, except that the 1-hydroxy-8-aminonaphthalene-3,6-disulphonic acid in Example 1 is replaced by an equivalent amount of 1-hydroxy-8-aminonaphthalene-3,5-disulphonicacid giving the dyestuff of the formula

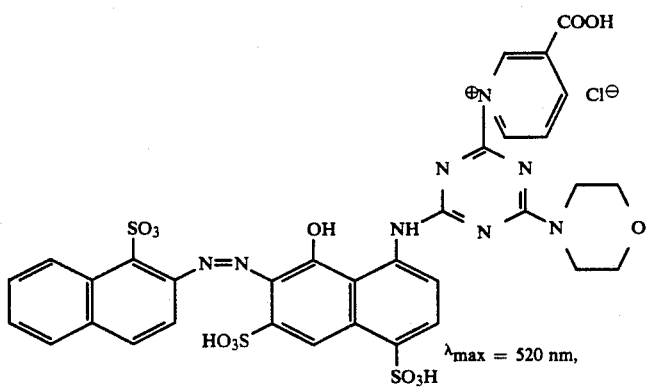

$\lambda_{max}$ = 520 nm, which likewise dyes cotton in clear blueish-red shades by an application process customary for reactive dyestuffs. The same result is obtained, if trifluorotriazine in Example 1 is replaced by an equivalent amount of trichlorotriazine and of course 1-hydroxy-8-aminonaphthalene-3,6-disulfonic acid by an equivalent amount of 1-hydroxy-8-aminonaphthalene-3,5-disulfonic acid.

EXAMPLE 3

The procedure described in Example 1 is repeated, except that the diazonium salt solution from 2-aminonaphthalene1,5-disulphonic acid prepared by customary methods is added to the solution of the coupling component prepared in Example 1, giving the dyestuff of the formula

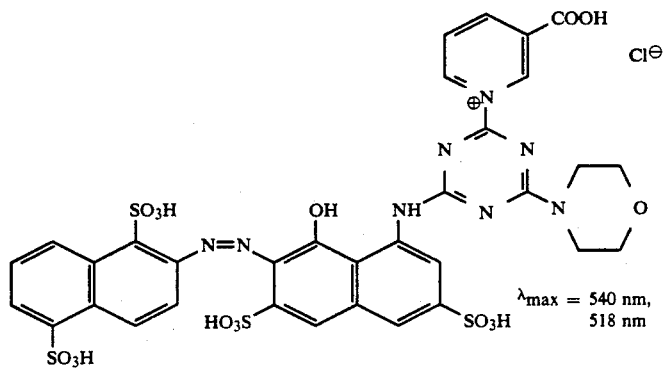

$\lambda_{max}$ = 540 nm, 518 nm which likewise dyes cotton in clear blueish-red shades by an application process customary for reactive dyestuffs.

EXAMPLE 4

The procedure described in Example 2 is repeated, except that the diazonium salt solution from 2-aminonaphthalene1,5-disulphonic acid prepared by customary methods is added to the coupling component described in Example 2, giving the dyestuff of the formula

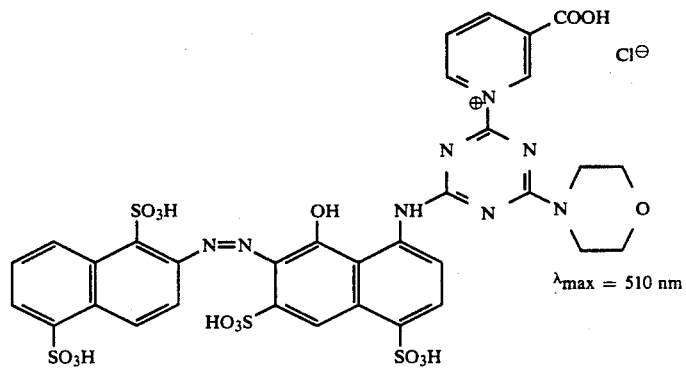

$\lambda_{max}$ = 510 nm which likewise dyes cotton in clear blueish-red shades by an application process customary for reactive dyestuffs.

EXAMPLE 5

The procedure described in Examples 1 and 2 is repeated, except that the 2-amino-1-naphthalenesulphonic acid in Examples 1 and 2 is replaced by 2-amino-1,6-naphthalenedisulphonic acid and nicotinic acid is replaced by nicotinamide, giving the dyestuffs of the formulae

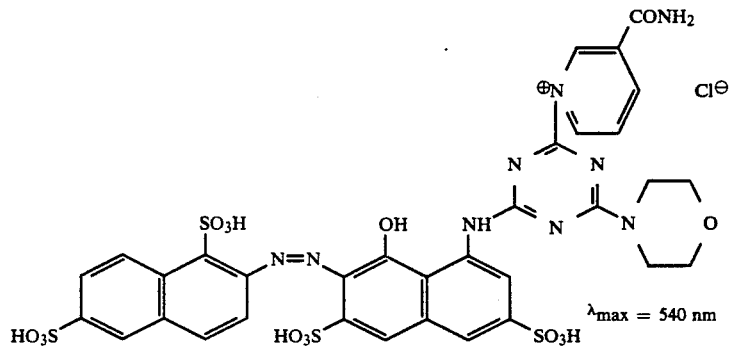

$\lambda_{max} = 540$ nm and

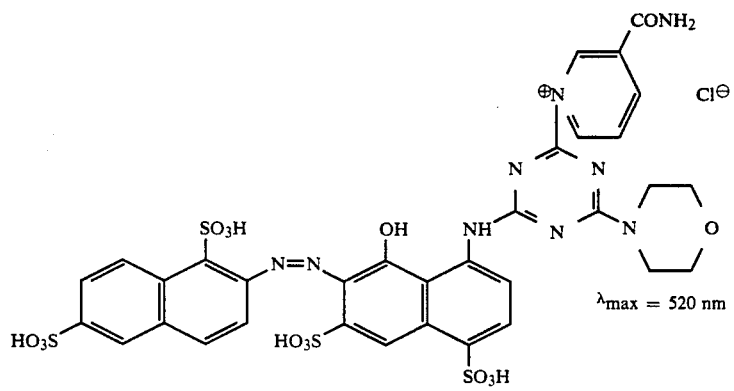

$\lambda_{max} = 520$ nm

These dyestuffs dye cotton in clear blueish-red shades by an application process customary for reactive dyestuffs.

EXAMPLE 6

The procedure described in Examples 1 and 2 is repeated, except that morpholine in Examples 1 and 2 is replaced by the corresponding amounts of N-hydroxyethylpiperazine, giving the dyestuffs of the formulae

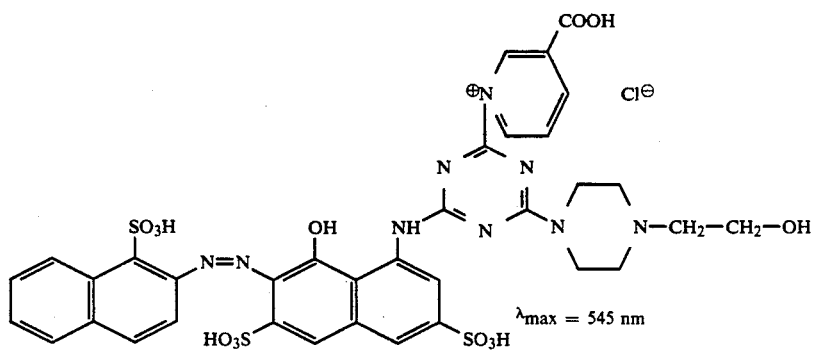

$\lambda_{max} = 545$ nm and

-continued

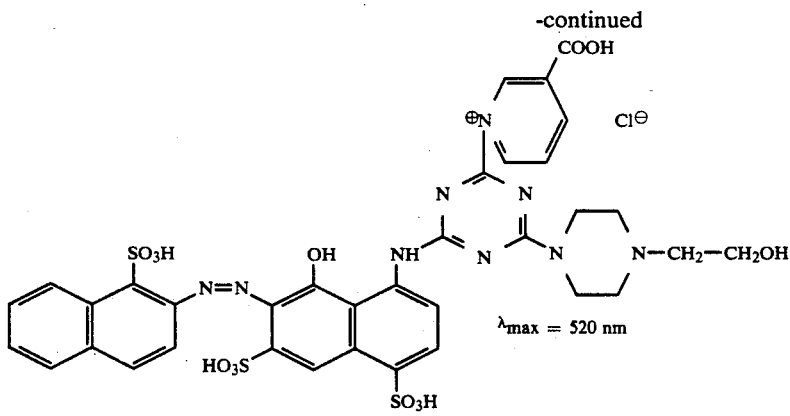

$\lambda_{max} = 520$ nm

These dyestuffs dye cotton in clear blueish-red shades by an application process customary for reactive dyestuffs.

EXAMPLE 7

The procedure of Example 1 is repeated, except that the amount of nicotinic acid used in Example 1 is replaced by isonicotinic acid (4-carboxypyridine), giving the dyestuff of the formula

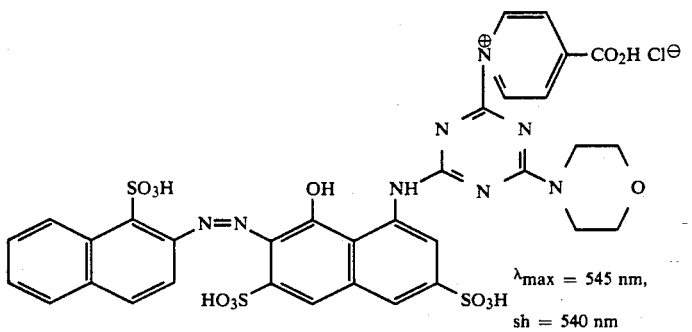

$\lambda_{max} = 545$ nm,
sh = 540 nm

Blueish-red dyeings are produced with these dyestuffs on cotton by an application process customary for reactive dyestuffs.

EXAMPLE 8

The procedure of Example 1 is repeated, except that in Example 1 the carboxyl group on the triazine ring in the nicotinic acid radical is replaced by a sulpho group, giving the dyestuff of the formula

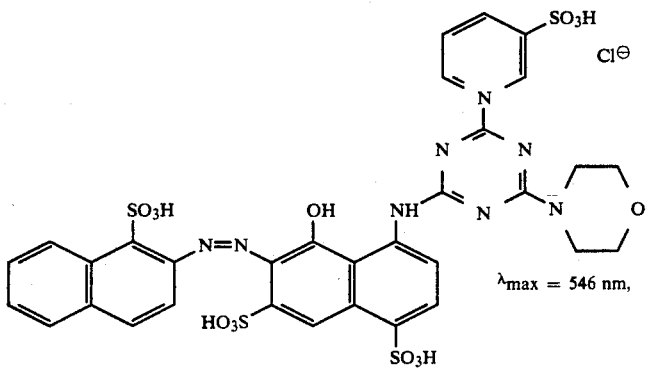

$\lambda_{max} = 546$ nm, which likewise dyes cotton in clear blueish-red shades by an application process customary for reactive dyestuffs.

We claim:

1. A fiber-reactive azo dyestuff, which in the form of the free acid has the following formula

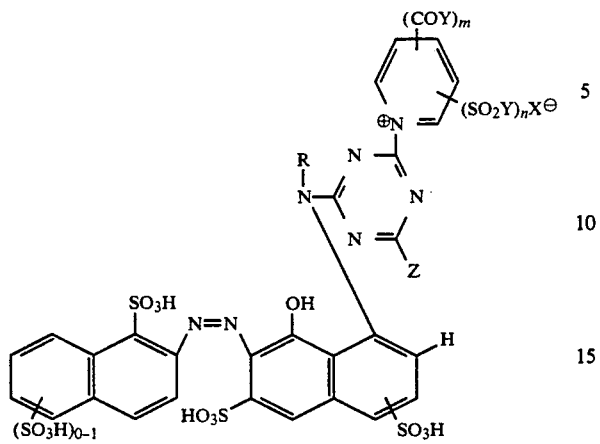

in which
- R = H or $C_1$-$C_6$-alkyl, in which the alkyl groups are unsubstituted or substituted by OH, halogen, $SO_3H$ or $OSO_3H$,
- Z = a saturated 5- or 6-membered heterocyclic ring containing a nitrogen heteroatom, or a saturated 5- or 6-membered heterocyclic ring containing a nitrogen heteroatom and one or more additional heteroatoms selected from the group consisting of N, O, S, and $SO_2$, and is bound to the triazine ring via the N atom,
- n, m = 0, 1 or 2, where m+n = 0, 1 or 2,
- Y = OH, OR, $NR_2R_3$, OMe,
- $R_3$, $R_2$ = independently represent H or $C_1$-$C_6$-alkyl, in which the alkyl groups are unsubstituted or substituted by OH, halogen, $SO_3H$ or $OSO_3H$, or together with the N atom to which they are attached form a heterocyclic 5- or 6-membered ring,
- Me = alkali metal or alkaline earth metal,
- $X^-$ = anion of a mono- or polybasic organic or inorganic acid.

2. Dyestuff according to claim 1, in which Z denotes

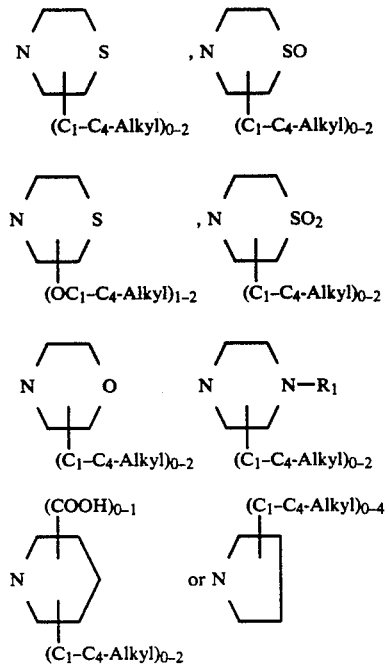

in which
- $R_1$ = H or $C_1$-$C_6$-alkyl which is unsubstituted or substituted by water-solubilising substituents.

3. Azo dyestuff according to claim 1 of the formula

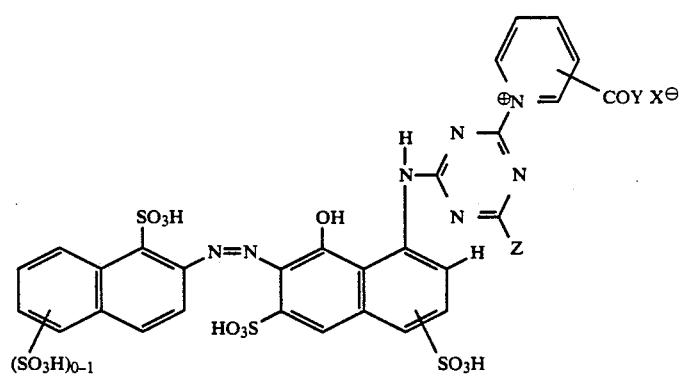

in which the substituents have the meaning given in claim 1.

4. Azo dyestuff according to claim 1 of the formula

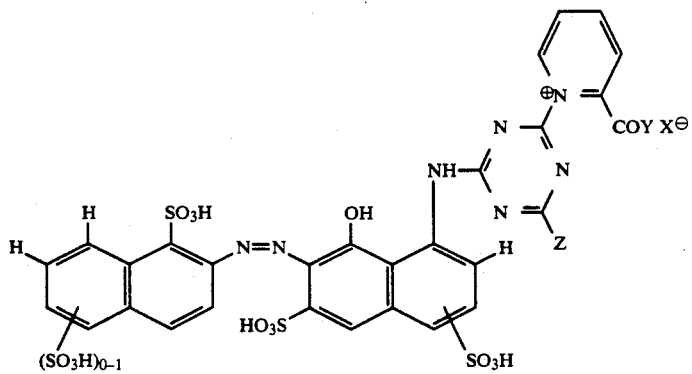
in which
Z =
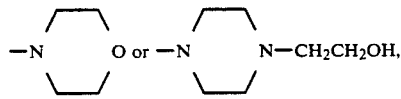
$Y_1$ = OH or $NH_2$,
$X^-$ = anion of a mono- or polybasic organic or inorganic acid.
5. Dyestuff according to claim 1 of the formulae
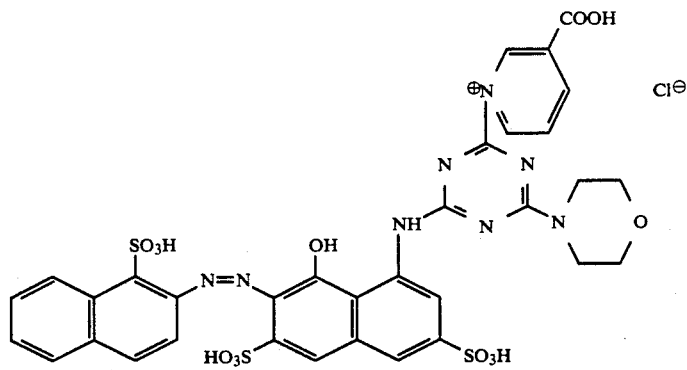
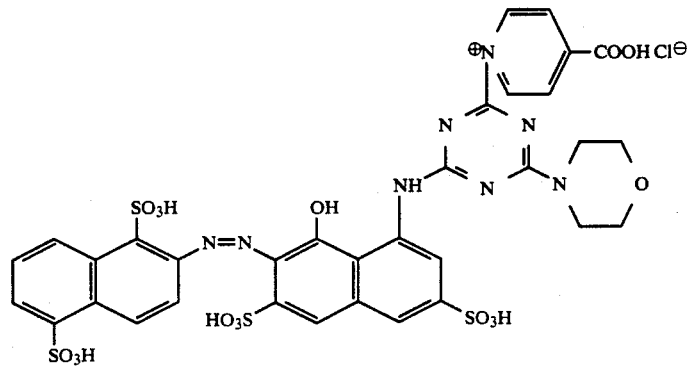

-continued
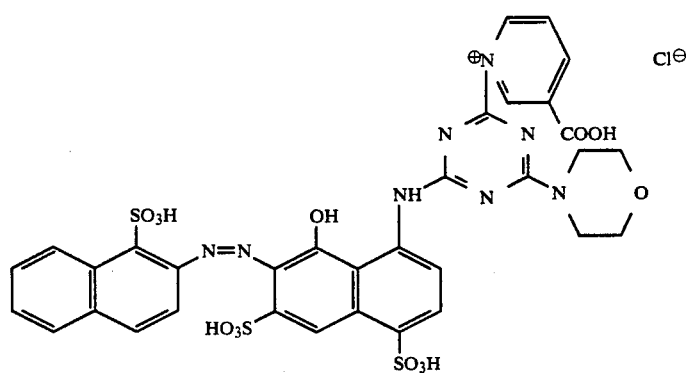
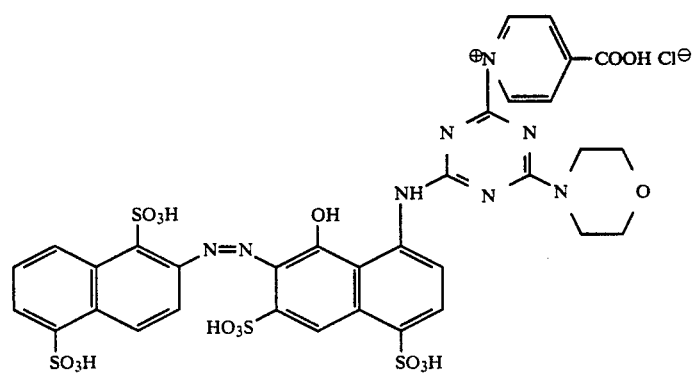
6. A process for the dyeing of a natural or synthetic fiber material, which comprises dyeing said material with a dyestuff according to claim 1.
* * * * *